US012054369B2

(12) United States Patent
Kasai

(10) Patent No.: US 12,054,369 B2
(45) Date of Patent: Aug. 6, 2024

(54) HOIST

(71) Applicant: Kito Corporation, Yamanashi (JP)

(72) Inventor: Takayuki Kasai, Yamanashi (JP)

(73) Assignee: KITO CORPORATION, Yamanashi (JP)

( * ) Notice: Subject to any disclaimer, the term of this patent is extended or adjusted under 35 U.S.C. 154(b) by 249 days.

(21) Appl. No.: 17/770,055

(22) PCT Filed: Sep. 17, 2020

(86) PCT No.: PCT/JP2020/035257
§ 371 (c)(1),
(2) Date: Apr. 19, 2022

(87) PCT Pub. No.: WO2021/079661
PCT Pub. Date: Apr. 29, 2021

(65) Prior Publication Data

US 2022/0363524 A1 Nov. 17, 2022

(30) Foreign Application Priority Data

Oct. 21, 2019 (JP) ................................ 2019-192146

(51) Int. Cl.
*B66D 3/00* (2006.01)
*B66C 13/16* (2006.01)
*B66D 3/26* (2006.01)

(52) U.S. Cl.
CPC ................ *B66D 3/26* (2013.01); *B66C 13/16* (2013.01); *B66D 2700/025* (2013.01)

(58) Field of Classification Search
CPC .... B66D 3/20; B66D 3/26; B66C 1/40; B66C 13/16
See application file for complete search history.

(56) References Cited

U.S. PATENT DOCUMENTS 3,330,154 A 7/1967 Habern et al.
4,635,903 A * 1/1987 Broyden .................. B66D 3/26 254/362

(Continued)

FOREIGN PATENT DOCUMENTS

CN 101134554 A 3/2008
CN 204150986 U 2/2015

(Continued)

OTHER PUBLICATIONS

Office Action issued Oct. 19, 2023 in Chinese Patent Application No. 202080088270.6 with English translation thereof.

(Continued)

*Primary Examiner* — Emmanuel M Marcelo
(74) *Attorney, Agent, or Firm* — XSENSUS LLP

(57) ABSTRACT

A hoist comprising: an upper hook; a support shaft that includes a hook-side large-diameter portion inserted through an insertion hole of the hook at a center portion, end large-diameter portions at both ends, an intermediate portion between the hook-side large-diameter portion and the end large-diameter portion, and a strain deformation portion that is provided at the intermediate portion; a main frame that includes a pair of support holes and is suspended and supported by the upper hook via the support shaft with the end large-diameter portion on one side inserted in the one support hole and the end large-diameter portion on the other side inserted in the other support hole; and a load measurement means that is attached to the strain deformation portion and measures a shear load acting on the strain deformation portion, wherein at least a portion of the intermediate portion is inserted in the support hole.

10 Claims, 6 Drawing Sheets

(56) References Cited

U.S. PATENT DOCUMENTS

| | | | | |
|---|---|---|---|---|
| 11,579,010 | B1 * | 2/2023 | Herrmann .............. | G01G 3/141 |
| 2008/0054237 | A1 | 3/2008 | Rotzler et al. | |
| 2011/0110715 | A1 * | 5/2011 | Andreasen ........... | A61G 7/1042<br>403/326 |
| 2017/0081152 | A1 | 3/2017 | Kosuga | |
| 2022/0250884 | A1 * | 8/2022 | Bogart ..................... | B66D 3/26 |
| 2023/0138172 | A1 * | 5/2023 | Omura ..................... | B66D 3/16<br>254/358 |

FOREIGN PATENT DOCUMENTS

| | | | |
|---|---|---|---|
| CN | 204297992 | U | 4/2015 |
| CN | 204324788 | U | 5/2015 |
| CN | 205709623 | U | 11/2016 |
| CN | 106458535 | A | 2/2017 |
| CN | 107218991 | A | 9/2017 |
| DE | 8520140 | U1 | 8/1985 |
| JP | 2-31507 | Y2 | 8/1990 |
| JP | 7-277685 | A | 10/1995 |
| JP | 9-227082 | A | 9/1997 |
| JP | 2018-128365 | A | 8/2018 |

OTHER PUBLICATIONS

International Search Report and Written Opinion mailed on Nov. 2, 2020, received for PCT Application PCT/JP2020/035257, Filed on Sep. 17, 2020, 8 pages including English Translation.

* cited by examiner

HOIST

CROSS REFERENCE TO RELATED APPLICATIONS

This is a U.S. national stage of application No. PCT/JP2020/035257, filed on Sep. 17, 2020. Priority under 35 U.S.C. § 119(a) and 35 U.S.C. § 365(b) is claimed from Japanese Patent Applications No. 2019-192146 filed on Oct. 21, 2019. The entire content and disclosure of each of the foregoing applications is incorporated herein by reference.

TECHNICAL FIELD

The present invention relates to a hoist.

BACKGROUND ART

Among hoists, there is one that measures a load of a hoist main body or a load to be hoisted by a load sensor and causes a motor to output a driving force corresponding to the measured load, as described in Patent Literature 1, for example. Patent Literature 1 discloses a configuration in which only the load in the vertical direction is detected even when a force is obliquely applied.

Specifically, a shaft (17), which is inserted into a hole portion of an upper hook (suspension member 16), is rotatably supported in the Ra direction by, of a bracket (18), a pair of extending portions facing each other on the upper side. Further, a connection shaft (19) of a load converter (3) is rotatably supported in the Rb direction by, of the bracket (18), a pair of extending portions facing each other on the lower side. Further, second connection parts (3 L, 3R) of the load converter (3) are rotatably supported in the Rc direction by connection plates (5L, 5R). Further, a strain part (3b) is attached to the load converter (3).

CITATION LIST

Patent Literature

{PTL 1} JP 2018-128365

SUMMARY OF INVENTION

Technical Problem

By the way, in the configuration described in Patent Literature 1, the upper hook (suspension member 16) supports the load of a load handling assist force device (1) and the load through the single shaft (17), and thus a thick shaft is employed. For this reason, an increase in size of the hoist is caused.

Further, in the configuration described in Patent Literature 1, the strain part (3b) is supported below the upper hook (suspension member 16) via a link mechanism that allows such rotations as described above, which makes the configuration complicated.

The present invention has been made in consideration of the above circumstances, and an object thereof is to provide a hoist including a sensor that accurately detects a load with a simple configuration without increasing in size of the hoist.

Solution to Problem

In order to solve the above-described problem, according to a first aspect of the present invention, there is provided a hoist being a hoist that hangs a load and raises and lowers the load, the hoist including: an upper hook that includes a hook base and an insertion hole penetrating the hook base in an orthogonal direction orthogonal to a hanging direction in which the load is hung; a support shaft that includes a hook-side large-diameter portion inserted through the insertion hole at a center portion and end large-diameter portions at both ends; a main frame that includes a pair of support holes and is suspended and supported by the upper hook via the support shaft with the end large-diameter portion on one side inserted in the one support hole and the end large-diameter portion on the other side inserted in the other support hole; and a strain deformation portion that is provided at an intermediate portion extending from, of the support shaft, the hook-side large-diameter portion to the end large-diameter portion, the strain deformation portion having a radial cross-sectional area smaller than that of the intermediate portion, and a load measurement means that is attached to the strain deformation portion and measures a shear load acting on the strain deformation portion, in which at least a portion of the intermediate portion extending from the hook-side large-diameter portion is inserted in the support hole.

Further, in the above-described invention, preferably, the insertion holes, which are two, are provided with center axis lines thereof parallel to each other, and the support shafts are inserted through the insertion holes respectively.

Further, in the above-described invention, preferably, the hoist includes a coming-off preventing means that hinders the support shaft from coming off of the support hole.

Further, in the above-described invention, preferably, the coming-off preventing means is provided on a board cover that covers a circuit board to which the load measurement means is electrically connected.

Further, in the above-described invention, preferably, the load measurement means is connected to the circuit board via a connection line, and the connection line is led along an axial direction of the support shaft and along a lateral groove recessed from an outer peripheral side.

Advantageous Effects of Invention

According to the present invention, it is possible to provide a hoist capable of having a safe and simple configuration by arranging a strain measurement unit of a support shaft in a support hole of a main frame.

DESCRIPTION OF EMBODIMENTS

Hereinafter, there is explained a hoist 10 according to one embodiment of the present invention based on the drawings.

Incidentally, in the following explanation, the Z direction indicates the hanging direction (vertical direction) in which a lower hook 160 is hung, the Z1 side indicates the upper side in the vertical direction, and the Z2 side indicates the lower side in the vertical direction. Further, in this embodiment, in the horizontal directions orthogonal to the vertical direction, the axial direction of a support shaft 100 is set to the X direction, and the X1 side indicates the right side in FIG. 3 and FIG. 4 and the X2 side indicates the left side in FIG. 3 and FIG. 4. Further, the Y direction indicates the direction orthogonal to the support shaft 100 and the Z direction.

1. Regarding the Configuration of the Hoist 10

Figure 1:
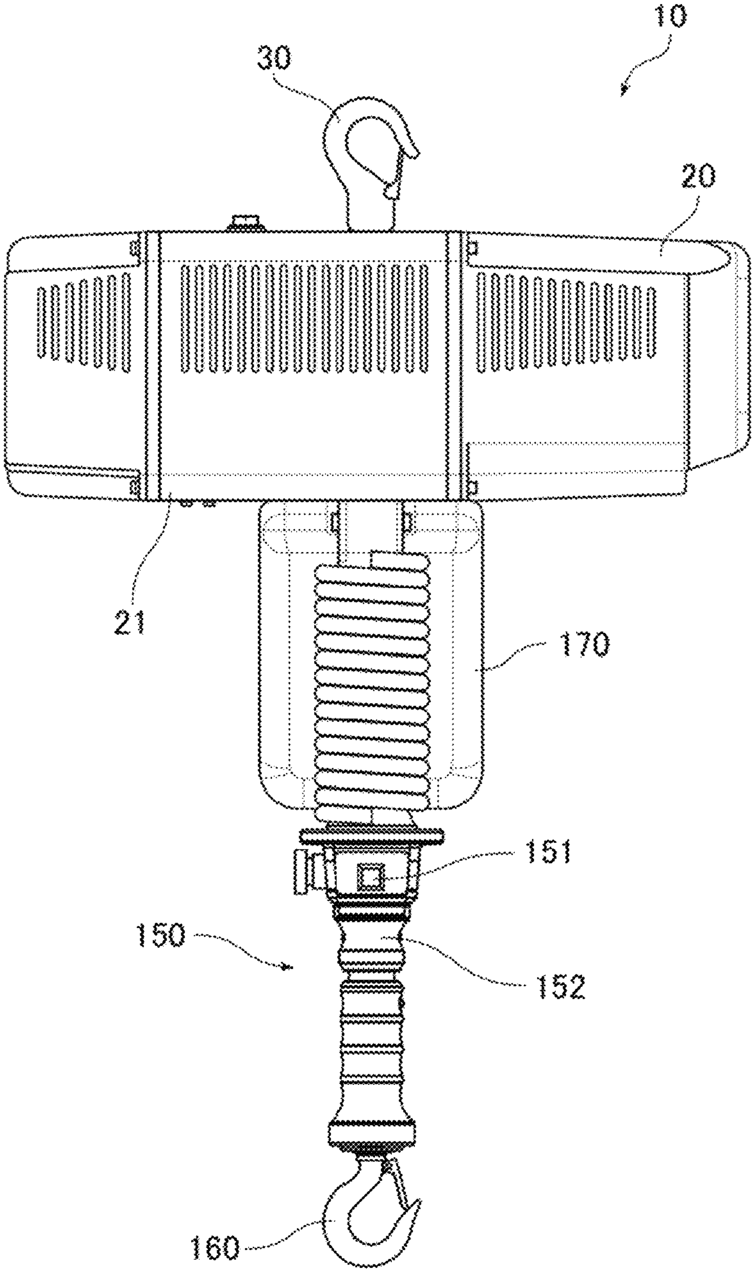
FIG. 1 is a view illustrating an entire configuration of a hoist according to one embodiment of the present invention.
Figure 2:
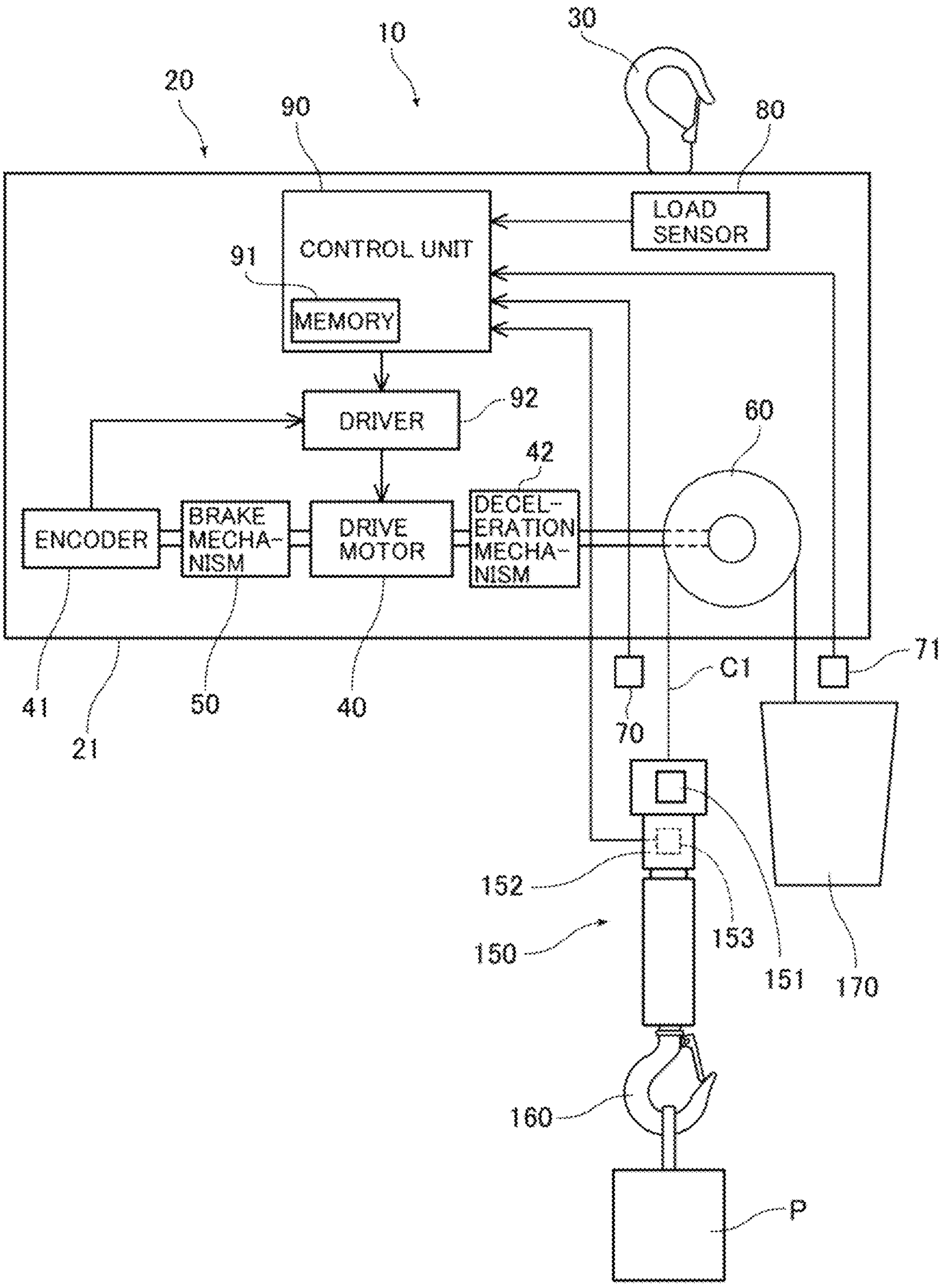
FIG. 2 is a view illustrating a control configuration of the hoist illustrated in FIG. 1.

FIG. 1 is a view illustrating an entire configuration of the hoist 10. FIG. 2 is a view illustrating a control configuration of the hoist 10. As illustrated in FIG. 1, the hoist 10 includes a hoist main body unit 20, an upper hook 30, a cylindrical operation device 150, and the lower hook 160 as main components.

The hoist main body unit 20 can be suspended from a predetermined portion of a ceiling, beam, or the like via the later-described upper hook 30. The hoist main body unit 20 contains various components in a hollow portion of a main frame 21. Specifically, in the hollow portion of the main frame 21, a drive motor 40, a deceleration mechanism 42, a brake mechanism 50, a load sheave 60, a load sensor 80, a control unit 90, and a driver 92 are provided.

The drive motor 40 is a motor that provides a driving force to drive the load sheave 60. In this embodiment, the drive motor 40 is a servo motor including a detector (encoder 41) intended for detecting a position, but it may be a motor other than the servo motor.

Further, the deceleration mechanism 42 is a part that decelerates the rotation of the drive motor 40 and transmits the rotation to the load sheave 60 side. Further, the brake mechanism 50 is a part that generates a brake force to hold a load P even in a state where the drive motor 40 is not operating, although it is a part that can release the brake force by electromagnetic force when the drive motor 40 is operating. The load sheave 60 is a part that hoists and lowers a load chain C1, and includes a plurality of chain pockets into which metal rings of the load chain C1 enter provided along its periphery.

The load sensor 80 corresponds to a load measurement means and is a sensor that measures the load acting between the later-described main frame 21 of the hoist main body unit 20 and the upper hook 30. In other words, the load sensor 80 is a sensor that detects the total load of the load of the hoist main body unit 20, the load of the load chain C1, and the load of the load P. A strain gauge can be used as the load sensor 80. Incidentally, an attachment structure for attaching the load sensor 80 will be described later.

The control unit 90 is a part that gives command values of position, speed, torque, and so on to the driver 92. Examples of the control unit 90 include a microcomputer, a sequencer, and so on.

Further, the driver 92 is a part that controls a power source supplied from the outside to an appropriate power based on a command value for controlling motor driving given by the control unit 90, and supplies the power to the drive motor 40 to rotate the drive motor 40.

Further, the cylindrical operation device 150 is an operation device for an operator to perform operation while holding it by hand, and is connected to the lower end side of the load chain C1. Further, the lower hook 160 for hanging the load P is connected to the cylindrical operation device 150. The cylindrical operation device 150 includes an operation mode changeover switch 151, a movable grip 152, and a displacement sensor 153.

Further, the movable grip 152 is provided to be slidable in the up and down direction (Z direction) and outputs a detection signal corresponding to the amount of sliding to the control unit 90. The control unit 90 controls driving of the drive motor 40 based on a load signal detected by the load sensor 80, the detection signal of the amount of sliding of the movable grip 152, or the like.

2. Regarding the Attachment Structure for Attaching the Load Sensor

Figure 3:
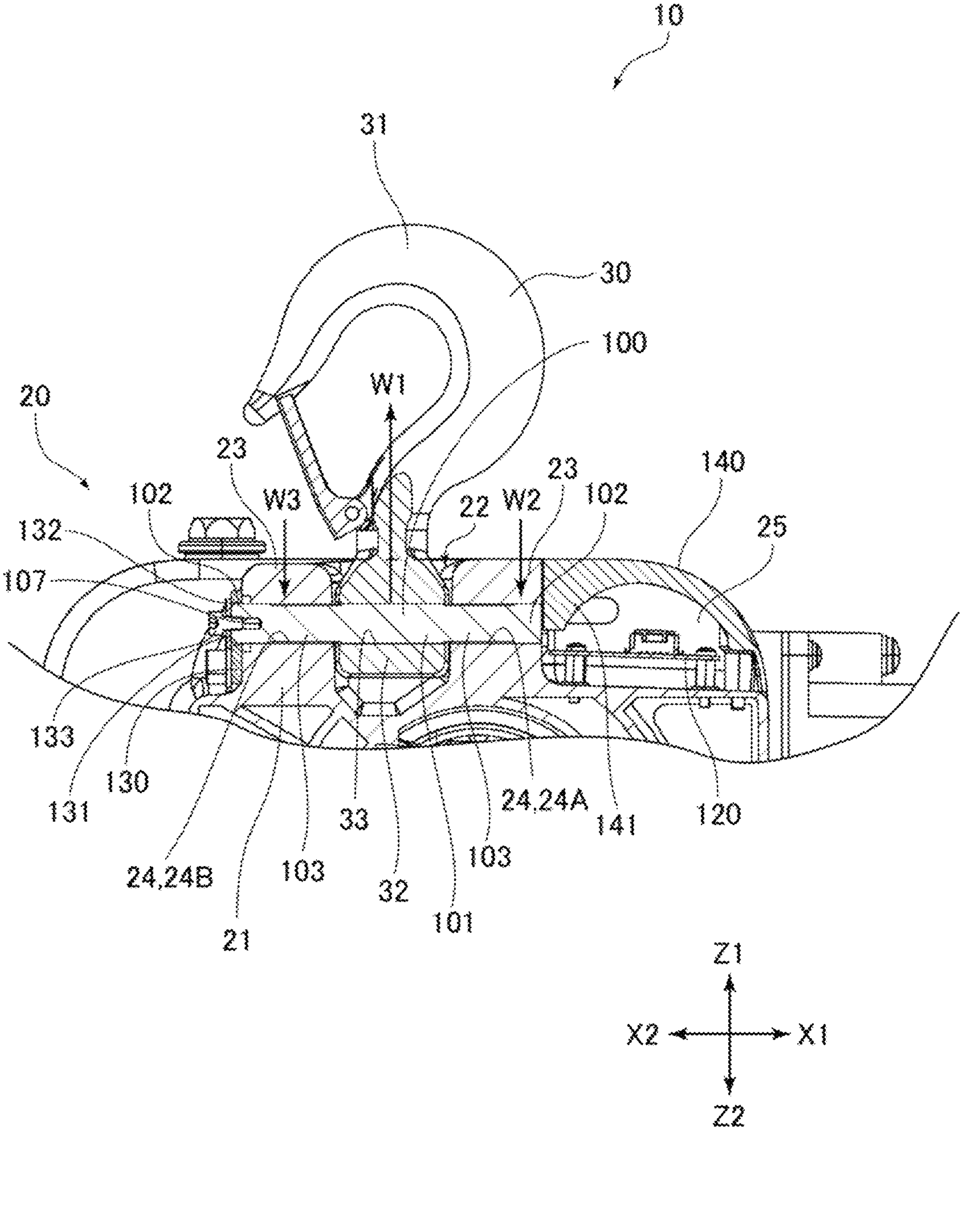
FIG. 3 is a side cross-sectional view illustrating an attachment structure of a load sensor in the hoist illustrated in FIG. 1.
Figure 4:
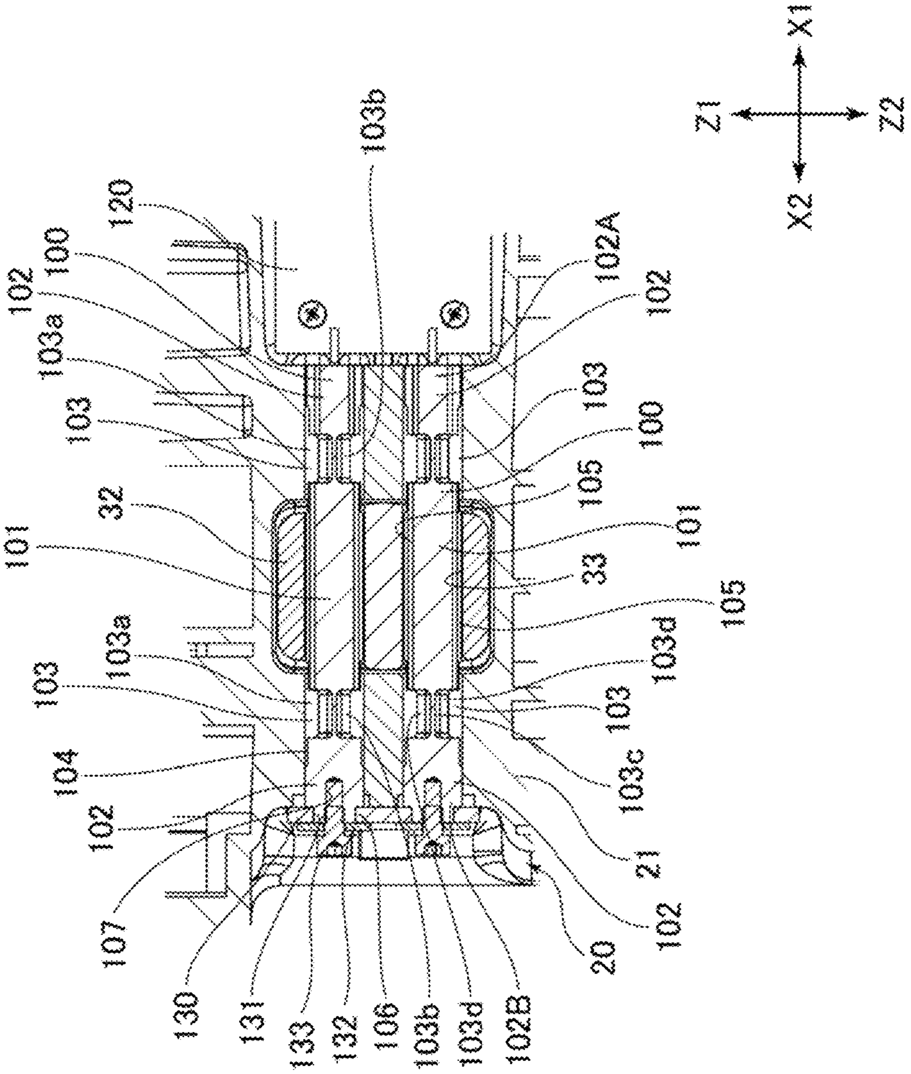
FIG. 4 is a plan cross-sectional view illustrating the attachment structure of the load sensor in the hoist illustrated in FIG. 1.

Next, details of the attachment structure for attaching the load sensor 80 will be explained below. FIG. 3 is a side cross-sectional view illustrating the attachment structure of the load sensor 80. FIG. 4 is a plan cross-sectional view illustrating the attachment structure of the load sensor 80. As illustrated in FIG. 3 and FIG. 4, in the upper portion of the main frame 21 of the hoist main body unit 20, a recessed portion for hook 22 recessed from the upper surface is provided, and a pair of support block portions 23 are also provided so as to surround the recessed portion for hook 22.

In the above-described support block portions 23, a support hole 24 is provided. The support hole 24 is provided along a direction (X direction) vertical to the hanging direction (Z direction) in which the load P is assumed to be hung, and is provided so as to penetrate the above-described support block portions 23. The later-described support shaft 100 is inserted into the support holes 24.

Further, the upper hook 30 includes a hook portion 31 and a hook base 32. The hook portion 31 is a hook-shaped portion that is hung on a predetermined portion (such as a beam) on the ceiling side, for example. Further, the hook base 32 is a portion located at the lower side (Z2 side) in the vertical direction (Z direction) than the hook portion 31, and is provided so as to have a thickness thereof larger than that of the hook portion 31. An insertion hole 33 is provided in this hook base 32. The insertion hole 33 is a hole that penetrates the hook base 32, and is provided along a direction (horizontal direction) orthogonal to the vertical direction (Z direction), which is the above-described hanging direction. The later-described support shaft 100 is inserted through this insertion hole 33.

Figure 5:
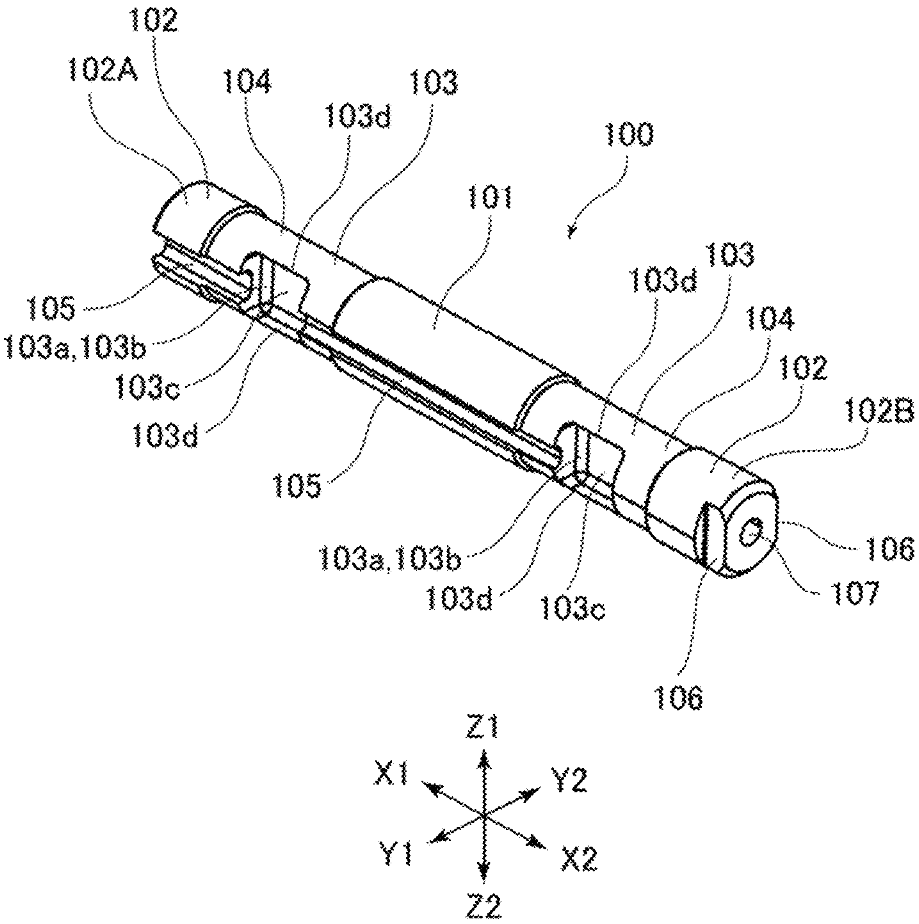
FIG. 5 is a perspective view illustrating a configuration of a support shaft provided in the hoist illustrated in FIG. 1.

Further, the support shaft 100 is a shaft member for attaching the upper hook 30 to the main frame 21. FIG. 5 is a perspective view illustrating a configuration of the support shaft 100. As illustrated in FIG. 3 to FIG. 5, the support shaft 100 is provided in a columnar shape (round bar shape) that has been processed appropriately. This support shaft 100 includes a hook-side large-diameter portion 101, end large-diameter portions 102, and intermediate portions 104.

The hook-side large-diameter portion 101 is provided at the center side in the axial direction (X direction) of the support shaft 100, as illustrated in FIG. 3 to FIG. 5. The center-side portion of the hook-side large-diameter portion 101 is inserted through the insertion hole 33. Then, as illustrated in FIG. 3, the intermediate portions 104 are formed from both ends of the hook-side large-diameter portion 101, and then the end large-diameter portions 102 are formed coaxially.

Further, the end large-diameter portions 102 are provided on one end side (X1 side) in the axial direction (X direction) and on the other end side (X2 side) in the axial direction (X direction) of the support shaft 100 respectively. In the following explanation, the end large-diameter portion 102 located at one end side (X1 side) is referred to as one end large-diameter portion 102A, and the end large-diameter portion 102 located at the other end side (X2 side) is referred to as the other end large-diameter portion 102B.

The one end large-diameter portion 102A is inserted in the support hole 24 (to be referred to as a support hole 24A below) present in the support block portion 23 on one side. Further, the other end large-diameter portion 102B is inserted in the support hole 24 (to be referred to as a support hole 24B below) present in the support block portion 23 on the other side. Incidentally, in this embodiment, the other end side of the other end large-diameter portion 102B projects from the support hole 24B, while the one end side of the one end large-diameter portion 102A does not project from the support hole 24A.

Further, as illustrated in FIG. 4 and FIG. 5, the intermediate portion 104 is a portion that transmits a loading load, which extends from the hook-side large-diameter portion 101 to the end large-diameter portion 102, and has a strain deformation portion 103 formed at a center portion thereof. As illustrated in FIG. 3, the intermediate portion 104 is a portion having a diameter slightly smaller than that of the hook-side large-diameter portion 101 and the end large-diameter portion 102, and the intermediate portion 104 is small enough in diameter that it does not come into contact with the support hole 24 or the insertion hole 33 even if a load acts between the main frame 21 and the upper hook 30 to strain the support shaft 100. Instead of making the intermediate portion 104 smaller in diameter than the hook-side large-diameter portion 101, the portion of the support hole 24 facing the intermediate portion 104 may be made large enough in diameter to prevent the intermediate portion 104 from coming into contact therewith. In the strain deformation portion 103, a first recessed portion 103*a* that is recessed from one side (Y1 side) in the direction (Y direction) orthogonal to the axial direction (X direction) of the support shaft 100 and the vertical direction (Z direction) and a second recessed portion 103*b* that is recessed from the other side (Y2 side) are provided. Then, between the first recessed portion 103*a* and the second recessed portion 103*b*, a connecting portion 103*c* is provided.

Incidentally, in addition to the connecting portion 103*c*, the first recessed portion 103*a* and the second recessed portion 103*b* are also provided with a pair of upper and lower flange portions 103*d* that are connected by the connecting portion 103*c*. Therefore, the strain deformation portion 103 has a substantially H shape in cross section when viewed from the front of the first recessed portion 103*a* and the second recessed portion 103*b*, has a cross-sectional area smaller than that of the intermediate portion 104, and has a shape that allows the load sensor 80 (strain gauge) to accurately measure a shear strain.

Incidentally, the intermediate portion 104 is a portion that faces the inner surface of the support hole 24 in a non-contact manner. With the presence of this intermediate portion 104, a space for the strain deformation portion 103 to be shear-deformed is secured. Incidentally, the intermediate portion 104 is provided on each of the hook-side large-diameter portion 101 side and the end large-diameter portion 102 side. Incidentally, it may be interpreted that the intermediate portion 104 on the hook-side large-diameter portion 101 side forms a portion of the hook-side large-diameter portion 101, and it may be interpreted that the intermediate portion 104 on the end large-diameter portion 102 side also forms a portion of the end large-diameter portion 102.

Further, the above-described load sensor 80 is arranged at each of the first recessed portion 103*a* and the second recessed portion 103*b*. The load sensor 80 is a strain gauge that measures electrical resistance changes due to strain deformation using, for example, a Wheatstone bridge circuit, and is attached to the connecting portion 103*c*. In other words, in the support shaft 100, the load sensors 80 are attached to both side surfaces of the connecting portion 103*c* formed at the X-Z plane of the strain deformation portion 103, which has a cross-sectional area smaller than that of the hook-side large-diameter portion 101 and the end large-diameter portion 102. Therefore, in the case where a load (shear loading load) acts on the support shaft 100 in the up and down direction, the connecting portion 103*c* is deformed elastically greater than the hook-side large-diameter portion 101 and the end large-diameter portion 102. Accordingly, the connecting portion 103*c* is suitable for measuring the amount of shear strain (namely, the load) by attaching the load sensors 80 thereto.

Incidentally, in the support shaft 100, the strain deformation portion 103 is generally the portion with the smallest cross-sectional area. However, the support shaft 100 may employ a configuration with the presence of a portion having a cross-sectional area smaller than that of the strain deformation portion 103 at a portion intended for purposes other than the acting of a load.

Here, in the case where a load repeatedly acts on the support shaft 100 in the shear direction, the strain deformation portion 103 is the portion that is most prone to fracture because it is the portion where the cross-sectional area is drastically reduced compared to other portions and is the portion where stress concentration occurs most. In other words, the strain deformation portion 103 corresponds to a dangerous cross-section (fracture expected portion), which is a portion of the support shaft 100 that is most prone to fracture.

Figure 6:
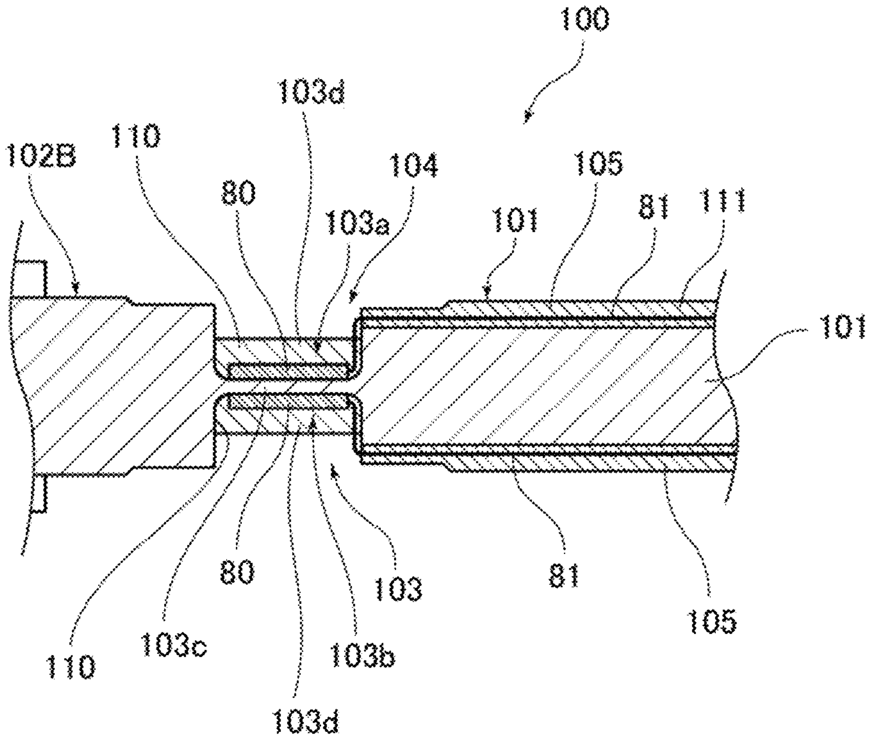
FIG. 6 is a cross-sectional view illustrating a state where connection lines are guided in guide grooves of the support shaft provided in the hoist illustrated in FIG. 1.

Incidentally, in the case where the load sensors 80 are attached to the connecting portion 103*c* as illustrated in FIG. 4, the load sensors 80 are covered with a sealing member 110 such as resin, as illustrated in FIG. 6. For this reason, the load sensors 80 are in a state of not being exposed to the outside.

Further, lateral grooves 105 are also provided in the support shaft 100. FIG. 6 is a cross-sectional view illustrating a state where connection lines 81 of the load sensors 80 are wired to the lateral grooves 105 in the support shaft 100. As illustrated in FIG. 6, the lateral groove 105 is a groove for leading the connection line 81 intended for electrically connecting the load sensor 80 and a circuit board 120, and is recessed from the outer peripheral surface of the support shaft 100. Such lateral grooves 105 are provided on one side and the other side in the horizontal direction (Y-axis direction) (on both sides in the horizontal direction along the axis of the support shaft) across the axial center of the support shaft 100. Here, as illustrated in FIG. 4, the circuit board 120 is provided on one side (X1 side) in the axial direction (X direction) with respect to the one end large-diameter portion 102A. Therefore, in the configuration illustrated in FIG. 4 and FIG. 5, the lateral grooves 105 are provided in the axial direction (X direction) so as to go through the hook-side large-diameter portion 101 and the one end large-diameter portion 102A, and the lateral grooves 105 connect the paired first recessed portions 103*a* and the paired second recessed portions 103*b*, respectively, but are not provided in the other end large-diameter portion 102B. The connection lines 81 arranged in the lateral grooves 105 are sealed by a sealing member 111 to closely adhere to the support shaft 100 in the same manner as the load sensors 80.

Incidentally, one end of the connection line 81 is mounted on the circuit board 120, where a detection signal from the load sensor 80 is input. The circuit board 120 has a function of an amplifier that amplifies the detection signal from the load sensor 80. Further, the circuit board 120 outputs an electrical signal based on the detection signal from the load sensor 80 to the above-described control unit 90. The circuit board 120 is attached to, of the main frame 21, a predetermined portion in a board attaching space 25, which is a hollow portion on the upper right side in FIG. 3.

Incidentally, with one end of the connection line 81 mounted on the circuit board 120, the connection line 81 also functions as a coming-off preventing means to hinder the support shaft 100 from coming off of the support hole 24. In order to improve such a function as the coming-off preventing means, at least a portion of the connection line 81 may be fixed to a predetermined portion of the main frame 21 by a not-illustrated wiring fixing member.

Here, in this embodiment, the load sensors 80 (strain gauges) are attached to four points on the support shaft 100, and a plurality of connection lines from the respective load sensors 80 form the connection line 81. The support shaft 100 is prevented from coming off to the side where the circuit board 120 is arranged by the connection lines 81, and is prevented from coming off by a later-described coming-off preventing plate on the side opposite to the side where the circuit board 120 is arranged.

Further, to the other side (X2 side) of the support shaft 100, a coming-off preventing plate 130 forming the coming-off preventing means is attached. The coming-off preventing plate 130 is in contact with an end surface 23B1 on the other side of the support block portion 23 on the other side to be fixed thereto by a means such as screwing. Further, in the coming-off preventing plate 130, an insertion hole 131 is provided, and a pair of cutout portions 106 present on the other end side of the support shaft 100 are inserted in the insertion hole 131. As illustrated in FIG. 5, the cutout portion 106 is a portion in which the other end side of the support shaft 100 is cut out in a plane in a state parallel to the axial direction (X direction) of the support shaft 100. The engagement of the coming-off preventing plate 130 and the cutout portions 106 results in positioning of the support shaft 100 in the rotational direction.

Incidentally, on the other end side of the support shaft 100, a screw hole 107 having a predetermined depth along the axial direction (X direction) is provided. Then, by screwing a screw 133 into the screw hole 107 via a washer 132 or the like, the coming-off preventing plate 130 is attached and fixed to the support shaft 100. Accordingly, the support shaft 100 is fixed to the main frame 21 and hindered from moving in the axial direction and coming off of the support hole 24 and the insertion hole 33.

On the other hand, on one end side (X1 side) of the support shaft 100, a board cover 140 is attached to the main frame 21 via a screw or the like. The board cover 140 is provided with a flange portion 141, and the flange portion 141 is attached to the main frame 21 so as to block at least a portion of the opening on one side of the support hole 24 present in the support block portion 23 on one side. Therefore, the board cover 140 (flange portion 141) corresponds to the coming-off preventing means to hinder the support shaft 100 from coming off of the support hole 24.

3. Regarding the Action

In the hoist 10 having the above configuration, as illustrated in FIG. 3, in the case where the hoist 10 is suspended by the upper hook 30, an upward load W1 acts on the hook-side large-diameter portion 101 of the support shaft 100 by the hook base 32. On the other hand, downward loads W2 and W3 act on the one end large-diameter portion 102A and the other end large-diameter portion 102B by the support block portions 23.

Therefore, of the support shaft 100, the strain deformation portion 103 is provided to have a small cross-sectional area at the intermediate portion 104 on which the shear force acts. Therefore, the strain deformation portion 103 is greatly deformed in the shear direction in the intermediate portion 104 by the action of the above-described loads W1 to W3, and displacement of the strain deformation portion 103 is detected by the load sensors 80.

Here, in the case where the loads act on the hoist 10 repeatedly and the support shaft 100 fractures, the fracture portion is usually the strain deformation portion 103 where stress concentration occurs most among the portions of the support shaft 100 on which the shear load acts. Here, the intermediate portion 104 is present within the inside of the support hole 24. As a result, even if the support shaft 100 fractures at the strain deformation portion 103, the portion of the intermediate portion 104 formed at the end of the hook-side large-diameter portion 101, where no strain deformation portion is formed, comes into contact with an inner wall surface of the support hole 24 to receive the downward loads W2, W3. Therefore, the upper hook 30 is securely prevented from coming off of the hoist main body unit 20. The intermediate portion 104 is a portion that is arranged in the support hole 24 together with the strain deformation portion 103 and does not come into contact with the support hole 24 even if the load applied to the support shaft 100 causes the load to be strain-deformed, and the strain deformation portion 103 is formed at the center portion of the intermediate portion 104. Even if the strain deformation portion 103 fractures, the upper hook 30 will not come off of the main frame 21 because the intermediate portion 104, which has a cross-sectional area larger than that of the strain deformation portion 103, is supported by the support hole 24.

In addition, even if the support shaft 100 tries to move toward the other side (X2 side) in the axial direction (X direction) due to the fracture of the support shaft 100 or other causes, the movement is hindered by the coming-off preventing plate 130. Further, even if the support shaft 100 tries to move toward the one side (X1 side) in the axial direction (X direction), the movement is hindered by the flange portion 141 of the board cover 140.

Incidentally, even when the board cover 140 has been removed, the support shaft 100 is hindered from coming off of the support hole 24 by the connection line 81 having one end thereof mounted on the circuit board 120. The connection lines 81 are wired closely to the side surfaces of the support shaft 100, and thus, in the case where the support shaft 100 has fractured, electrical signals from the load sensors 80 and the connection lines 81 become abnormal to allow the control unit 90 to detect the fracture of the support shaft 100 before the support shaft 100 falls off.

<3. Regarding the Effects>

The hoist 10 having the above configuration includes the upper hook 30 including the hook base 32 and the insertion hole 33 that penetrates the hook base 32 in the orthogonal direction orthogonal to the hanging direction (Z direction) in which the load P is hung. Further, the hoist 10 includes the support shaft 100 including the hook-side large-diameter portion 101, which is inserted through the insertion hole 33, at the center portion and the end large-diameter portions 102 at both ends. Further, the hoist 10 includes: the main frame 21 that includes a pair of the support holes 24 and is suspended and supported by the upper hook 30 via the support shaft 100 with the end large-diameter portion 102 (one end large-diameter portion 102A) on one side inserted in the one support hole 24 and the end large-diameter portion 102 (other end large-diameter portion 102B) on the other side inserted in the other support hole 24; and the strain deformation portion 103 that is provided at the intermediate portion 104 extending from, of the support shaft 100, the hook-side large-diameter portion 101 to the end large-diameter portion 102, the strain deformation portion 103 having a radial cross-sectional area smaller than that of the intermediate portion 104, and the load measurement means (strain deformation portion 103, load sensor 80) that is attached to the strain deformation portion 103 and measures the shear load acting on the strain deformation portion 103. Then, at least a portion of the intermediate portion 104 extending from the hook-side large-diameter portion 101 are inserted in the one support hole 24 and the other support hole 24 respectively.

Therefore, in the case where the load acts repeatedly and the support shaft 100 fractures, in the hoist 10, the strain deformation portion 103 having the smallest cross-sectional area among the portions of the support shaft 100 on which the shear load acts easily fractures. Here, the intermediate portion 104 extending from the hook-side large-diameter portion 101 is present within the inside of the support hole 24. Therefore, even if the support shaft 100 fractures at the strain deformation portion 103, the end side of the intermediate portion 104 comes into contact with the inner wall surface of the support hole 24 to receive the downward loads W2 and W3. As a result, it becomes possible to prevent the upper hook 30 from coming off of the hoist main body unit 20. Thereby, it is possible to prevent the hoist main body unit 20 and the load P from falling downward. Thereby, it becomes possible to prevent damage to the hoist 10 and accidents caused by falling.

Further, in this embodiment, while employing a simple configuration in which the support shaft 100 is only inserted through the insertion hole 33 of the upper hook 30 and inserted in the support holes 24 of the support block portions 23, it becomes possible to realize the configuration that prevents the upper hook 30 from coming off of the hoist main body unit 20 described above.

Further, in this embodiment, in the hook base 32, the insertion holes 33, which are two, are provided with their center axis lines parallel to each other, and the support shafts 100 are inserted through the insertion holes 33 respectively.

Therefore, it becomes possible to prevent the hoist main body unit 20 from rotating with respect to the upper hook 30. Therefore, the posture of the hoist 10 can be stabilized, and the accuracy of load measurement by the load sensors 80 can be improved. Further, even if one of the support shafts 100 fractures, the presence of the other support shaft 100 makes it possible to well prevent the hoist main body unit 20 and the load P from falling.

Further, in this embodiment, there are provided the coming-off preventing plate 130 and the board cover 140 (coming-off preventing means) that hinder the support shaft 100 from coming off of the support hole 24.

Therefore, the coming-off preventing plate 130 (coming-off preventing means) and the board cover 140 (coming-off preventing means) can hinder the support shaft 100 from trying to come off of the support hole 24 and the insertion hole 33 along the axial direction (X direction). As a result, even if the support shaft 100 fractures at the strain deformation portion 103, it is possible to prevent falling of the hoist main body unit 20 and the load P caused by the support shaft 100 coming off of the support hole 24 and the insertion hole 33.

Further, in this embodiment, the coming-off preventing means is provided on the board cover 140 that covers the circuit board 120 to which the load sensor 80 (load measurement means) is electrically connected. Therefore, even if the support shaft 100 tries to move toward the other side (X2 side) in the axial direction (X direction) due to the fracture of the support shaft 100 or other reasons, the movement is hindered by the coming-off preventing means (flange portion 141) of the board cover 140. Accordingly, it is possible to prevent the hoist main body unit 20 and the load P from falling.

Further, in this embodiment, the load sensor 80 (load measurement means) is connected to the circuit board 120 via the connection line 81, and the connection line 81 is led along the axial direction (X direction) of the support shaft 100 and along the lateral groove 105 recessed from the outer peripheral side.

As a result, even if the support shaft 100 tries to come off of the support hole 24 and the insertion hole 33 along the axial direction (X direction), by being pulled, the connection line 81 mounted on the circuit board 120 can function as the coming-off prevention to prevent the support shaft 100 from coming off.

4. Modified Example

Hitherto, the embodiment of the present invention has been explained, but besides this, various modifications can be made in the present invention. The following describes these.

In the above-described embodiment, as the hoist, the cylindrical operation device 150 is provided and further there is explained a configuration in which the operation mode can be switched between a switch operation mode and a balancer mode by the operation mode changeover switch 151. However, the hoist is not limited to this type. For example, the hoist may be a type including the cylindrical operation device 150 but not including the operation mode changeover switch 151 described above. Further, the hoist may be a hoist not including the cylindrical operation device 150. Furthermore, the hoist may have a configuration including a rope drum to wind a rope, without including the load sheave 60 on which the load chain C1 is hung.

Further, in the above-described embodiment, there is explained the configuration in which the end sides of the hook-side large-diameter portion 101 are inserted in the support holes 24 of the support block portions 23. However, the hoist may employ another configuration. For example, there may be employed a configuration in which the strain deformation portion 103 is arranged in the insertion hole 33 of the hook base 32 and at least a portion of the intermediate portion 104 on the end large-diameter portion 102 side is inserted in the insertion hole 33.

The invention claimed is:

1. A hoist that hangs a load and raises and lowers the load, the hoist comprising:

an upper hook that includes a hook base and a first insertion hole penetrating the hook base in an orthogonal direction orthogonal to a hanging direction in which the load is hung;

a first support shaft that includes a hook-side large-diameter portion inserted through the first insertion hole at a center portion, end large-diameter portions at both ends, an intermediate portion extending from the hook-side large-diameter portion to the end large-diameter portion, and a strain deformation portion that is provided at the intermediate portion and having a radial cross-sectional area smaller than that of the intermediate portion;

a main frame that includes a pair of support holes and is suspended and supported by the upper hook via the first support shaft with the end large-diameter portion on one side inserted in the one support hole and the end large-diameter portion on the other side inserted in the other support hole; and a load measurer that is attached to the strain deformation portion and measures a shear load acting on the strain deformation portion, wherein at least a portion of the intermediate portion extending from the hook-side large-diameter portion is inserted in the support hole.

2. The hoist according to claim 1, wherein the upper hook further includes a second insertion hole penetrating the hook base in the orthogonal direction orthogonal to the hanging direction in which the load is hung, wherein the hoist further comprises a second support shaft, and wherein the first and second insertion holes are provided with respective center axis lines thereof parallel to each other, and the first and second support shafts are inserted through the first and second insertion holes, respectively.

3. The hoist according to claim 2, further comprising: a retainer that hinders the first support shaft from coming off of one or more of the pair of support holes.

4. The hoist according to claim 2, wherein the load measurer is connected to a circuit board via a connection line, and the connection line is led along an axial direction of the first support shaft and along a lateral groove recessed from an outer peripheral side.

5. The hoist according to claim 3, wherein the load measurer is connected to a circuit board via a connection line, and the connection line is led along an axial direction of the first support shaft and along a lateral groove recessed from an outer peripheral side.

6. The hoist according to claim 1, further comprising: a retainer that hinders the first support shaft from coming off of one or more of the pair of support holes.

7. The hoist according to claim 6, wherein the retainer is provided on a board cover that covers a circuit board to which the load measurer is electrically connected.

8. The hoist according to claim 7, wherein the load measurer is connected to the circuit board via a connection line, and the connection line is led along an axial direction of the first support shaft and along a lateral groove recessed from an outer peripheral side.

9. The hoist according to claim 6, wherein the load measurer is connected to a circuit board via a connection line, and the connection line is led along an axial direction of the first support shaft and along a lateral groove recessed from an outer peripheral side.

10. The hoist according to claim 1, wherein the load measurer is connected to a circuit board via a connection line, and the connection line is led along an axial direction of the first support shaft and along a lateral groove recessed from an outer peripheral side.

* * * * *